United States Patent
Bishop

(10) Patent No.: US 11,306,976 B2
(45) Date of Patent: Apr. 19, 2022

(54) THERMAL MANAGEMENT SYSTEM

(71) Applicant: BAE Systems plc, London (GB)

(72) Inventor: Simon Bishop, Christchurch (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 17/427,678

(22) PCT Filed: Feb. 13, 2020

(86) PCT No.: PCT/GB2020/050330
§ 371 (c)(1),
(2) Date: Aug. 2, 2021

(87) PCT Pub. No.: WO2020/174213
PCT Pub. Date: Sep. 3, 2020

(65) Prior Publication Data
US 2022/0042747 A1 Feb. 10, 2022

(30) Foreign Application Priority Data

Feb. 26, 2019 (EP) ..................................... 19275021
Feb. 26, 2019 (GB) ..................................... 1902547

(51) Int. Cl.
*F28D 15/06* (2006.01)
*F28D 15/02* (2006.01)
(Continued)

(52) U.S. Cl.
CPC ........... *F28D 15/06* (2013.01); *B64D 13/006* (2013.01); *F28D 15/0208* (2013.01); *F28F 3/02* (2013.01);
(Continued)

(58) Field of Classification Search
CPC .. F28D 15/02; F28D 15/06; F28F 3/02; F28F 27/02
See application file for complete search history.

(56) References Cited

U.S. PATENT DOCUMENTS 5,369,960 A  12/1994  Mueller et al.
6,059,017 A  5/2000  Sayegh
(Continued)

FOREIGN PATENT DOCUMENTS

DE      19960616 A1   4/2001
DE   102017200624 A1   7/2018
(Continued)

OTHER PUBLICATIONS

Extended European Search Report for Patent Appl. No. 19275021.4, dated Aug. 21, 2019.
(Continued)

*Primary Examiner* — Lionel Nouketcha
(74) *Attorney, Agent, or Firm* — Maine Cernota & Rardin

(57) ABSTRACT

The present invention provides a vehicle (100) comprising: a body (4) having a skin; a heat source (12); and a thermal management system. The thermal management system comprises: a heat pipe (14) comprising: an evaporator end (close to 12) and a condenser end (close to heat exchanger 22*a*, 22*b*); a vapour arranged to flow from the evaporator end to the condenser end; and a working fluid arranged to flow from the condenser end to the evaporator end, wherein the heat pipe (14) is arranged such that the evaporator end is arranged in proximity to the heat source to absorb heat from the heat source; and one or more heat exchangers arranged in proximity to the condenser end and integrated with the skin. The present invention also provides a method of managing temperature in a vehicle.

14 Claims, 7 Drawing Sheets

(51) Int. Cl.
  *B64D 13/00*  (2006.01)
  *F28F 3/02*   (2006.01)
  *F28F 27/02*  (2006.01)
  *G05D 23/19*  (2006.01)

(52) U.S. Cl.
  CPC ......... *F28F 27/02* (2013.01); *G05D 23/1917*
     (2013.01); *F28D 15/02* (2013.01)

(56) References Cited

U.S. PATENT DOCUMENTS

| | | |
|---|---|---|
| 2004/0159118 A1 | 8/2004 | Hu |
| 2013/0331019 A1 | 12/2013 | Piesker |
| 2013/0333857 A1 | 12/2013 | Guering et al. |
| 2015/0068703 A1 | 3/2015 | de Bock et al. |
| 2018/0170553 A1 | 6/2018 | Wang et al. |

FOREIGN PATENT DOCUMENTS

| | | | |
|---|---|---|---|
| GB | 2519398 | A | 4/2015 |
| JP | H0476995 | A | 3/1992 |

OTHER PUBLICATIONS

Great Britain Search Report for Patent Appl. No. GB1902547.7 dated Aug. 13, 2019, 3 Pages.
PCT Search Report for Patent Appl. No. PCT/GB2020/050330 dated Feb. 13, 2020.
International Preliminary Report on Patentability for PCT/GB2020/050330 dated Sep. 10, 2021.

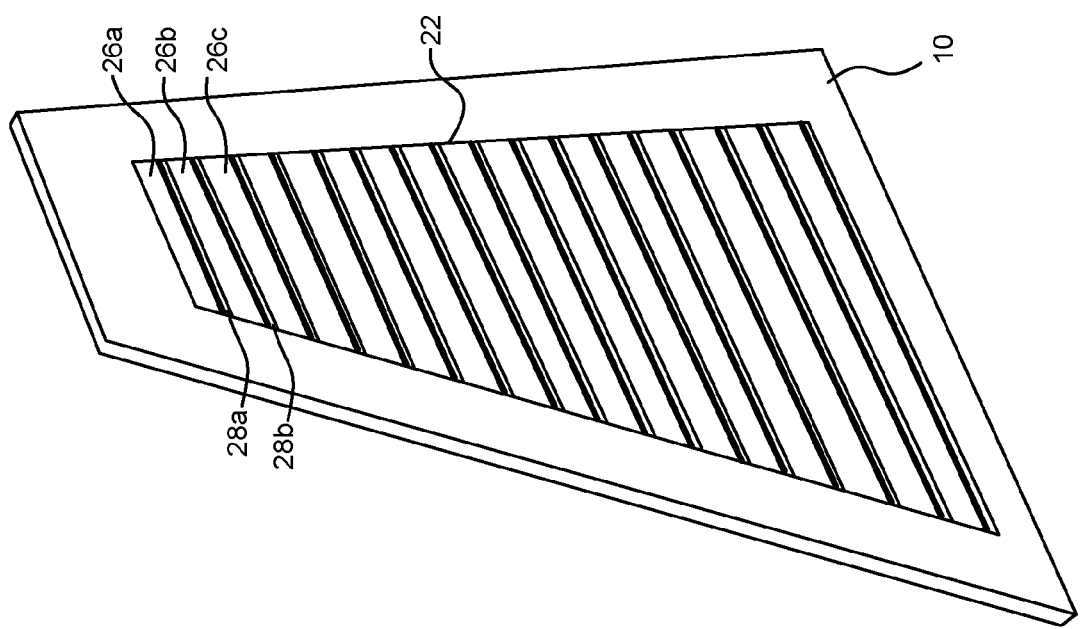

THERMAL MANAGEMENT SYSTEM

RELATED APPLICATIONS

This application is a national phase application filed under 35 USC § 371 of PCT Application No. PCT/GB2020/050330 with an International filing date of Feb. 13, 2020, which claims priority of GB Patent Application 1902547.7 filed on Feb. 26, 2019 and EP Patent Application 19275021.4 filed on Feb. 26, 2019. Each of these applications is herein incorporated by reference in its entirety for all purposes.

FIELD OF THE INVENTION

The present invention relates to a vehicle and a method of managing temperature in a vehicle.

BACKGROUND

High altitude long endurance (HALE) unmanned aircraft have been devised. These typically have long wingspans and low drag to improve their ability to operate efficiently for weeks or months at altitudes in excess of 15 km. Operating at relatively low speeds and at high altitudes, airflow over the aircraft's surfaces is low. Therefore, it is difficult to effectively remove heat generated by electronic components and friction of moving parts from the aircraft.

It would not be appropriate to fit an air conditioning unit or an arrangement of pumps and/or fans to a vehicle with stringent weight requirements, such as a HALE aircraft or a racing car.

Therefore, there is a need for a light weight means for removing heat from a vehicle.

SUMMARY

According to an aspect of the present invention, there is provided a vehicle comprising:
  a body having a skin;
  a heat source; and
  a thermal management system comprising:
    a heat pipe comprising:
      an evaporator end and a condenser end;
      a vapour arranged to flow from the evaporator end to the condenser end; and
      a working fluid arranged to flow from the condenser end to the evaporator end,
      wherein the heat pipe is arranged such that the evaporator end is arranged in proximity to the heat source to absorb heat from the heat source; and
    one or more heat exchangers arranged in proximity to the condenser end and integrated with the skin.

Advantageously, the heat pipe provides a lightweight means to transfer heat away from a heat source, reducing the overall weight of the vehicle. Further, due to the heat exchanger forming part of the skin, weight is further reduced along with the drag coefficient of the vehicle.

The vehicle may comprise:
  a first temperature sensor for measuring the temperature of the heat source;
  translation means for causing the heat pipe to translate from a first configuration to a second configuration in response to a control signal, wherein in the first configuration the evaporator end is arranged in proximity to the heat source and in the second configuration the evaporator end is arranged at a greater distance from the heat source than in the first configuration; and
  a processor arranged to receive a temperature measurement from the first temperature sensor and to generate a control signal to control the translation means to translate the heat pipe from the first configuration to the second configuration or from the second configuration to the first configuration depending on whether the temperature is respectively less than or greater than a threshold.

The heat pipe may be telescopic and the translation means may comprise means for selectively extending or contracting the heat pipe such that the evaporator end respectively moves toward or away from the heat source.

The translation means may comprise a pivot means for rotating at least part of the heat pipe in response to the control signal to move the evaporator end closer to or away from the heat source. Alternatively, the translation means may comprise means for relocating the heat pipe in response to the control signal to move the evaporator end closer to or away from the heat source.

The vehicle may comprise:
  a first temperature sensor for measuring the temperature of the heat source;
  switching means for modifying the flow of vapour along the heat pipe in response to a control signal to increase or decrease the rate of heat loss from the heat source; and
  a processor arranged to receive a temperature measurement from the first temperature sensor and to generate a control signal to control the switching means to modify the flow of vapour in dependence on the temperature measurement.

The one or more heat exchangers may each comprise one or more fins disposed in an opening in the body of the vehicle, a portion of each of the one or more fins may be arranged to substantially fill the opening and to match the contour of the adjacent skin surrounding the opening to form a portion of the skin, and the condenser end of the heat pipe may be arranged adjacent to each of the one or more fins.

The portion of a first one of the fins may be separated from the portion of a second one of the fins such that an air gap is provided between the fins.

The vehicle may comprise a first heat exchanger disposed on a first side of the vehicle and a second heat exchanger disposed on a second side of the vehicle, the first side being substantially opposite the second side, wherein a first part of the condenser end is arranged adjacent to the one or more fins of the first heat exchanger and a second part of the condenser end is arranged adjacent to the one or more fins of the second heat exchanger.

The vehicle may comprise:
  a second temperature sensor disposed on the first side of the vehicle to measure the temperature of the atmosphere proximate to the first heat exchanger;
  a third temperature sensor disposed on the second side of the vehicle to measure the temperature of the atmosphere proximate to the second heat exchanger;
  switching means for selectively directing the flow of vapour toward the first heat exchanger, the second heat exchanger, or both; and
  a processor in electrical communication with the second and third temperature sensors, the processor being arranged to:
    determine which of the first side and second side of the vehicle is cooler, and generate a control signal to control the switching means to direct the flow of vapour to the heat exchanger on the cooler side of the vehicle.

The at least one heat exchanger may be integrated with a tail fin of an aircraft.

The vehicle may be a High Altitude Long Endurance aircraft.

The at least one heat exchanger may be integrated with a spoiler of a car, such that the at least one fin forms a portion of the skin of the spoiler.

According to a second aspect of the present invention, there is provided a method of managing temperature in a vehicle according to the first aspect, comprising:
measuring the temperature of a heat source;
generating a control signal for controlling a switching means in dependence on the measured temperature; and
controlling the switching means to modify the flow path of vapour along the heat pipe in response to the control signal to increase or decrease the rate of heat loss from the heat source.

If the measured temperature is less than a first threshold, the switching means may be controlled to block the flow of vapour along the heat pipe to reduce heat loss from the heat source. If the measured temperature is greater than the first threshold, the switching means may be controlled to allow the flow of vapour along the heat pipe to increase heat loss from the heat source.

If the measured temperature is greater than a threshold, the switching means may be controlled to direct the flow of vapour along the heat pipe and a secondary heat pipe simultaneously.

According to a third aspect of the present invention, there is provided a method of managing temperature in a vehicle according to the first aspect, comprising:
measuring the temperature of a heat source;
generating a control signal for controlling a translation means in dependence on the measured temperature; and
controlling the translation means to translate the heat pipe to a first configuration if the measured temperature is greater than a threshold or to a second configuration if the measured temperature is less than a threshold, wherein in the first configuration the evaporator end is proximate to the heat source and in the second configuration the evaporator end is arranged at a greater distance from the heat source than in the first configuration.

The method may comprise extending or contracting the heat pipe in response to the control signal such that the evaporator end moves respectively closer to or away from the heat source. Alternatively, the method may comprise rotating at least part of the heat pipe or relocating the heat pipe in response to the control signal to move the evaporator end closer to or away from the heat source.

It will be appreciated that features described in relation to one aspect of the present invention can be incorporated into other aspects of the present invention. For example, an apparatus of the invention can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Embodiments of the invention will now be described by way of example only and with reference to the accompanying drawings.

FIG. 6 is a perspective view of a vertical tail fin having a heat exchanger as shown in FIG. 5.

For convenience and economy, the same reference numerals are used in different figures to label identical or similar elements.

DETAILED DESCRIPTION

Embodiments herein generally relate to a thermal management system for a vehicle. The thermal management system includes a heat pipe for drawing heat away from sources of heat within the vehicle, such as avionics, imaging systems and moving parts that generate heat through friction. Prior art thermal management systems for vehicles include, for example, radiators for cooling engines on cars or coolant systems powered by an auxiliary power unit for avionics bays in aircraft. These tend to be relatively heavy and complex systems and/or have a relatively high drag coefficient.

Further, in some embodiments the thermal management system includes heat exchangers integrally formed with the body of the vehicle, such that they form part of the skin of the vehicle. In some embodiments, described in more detail later, the thermal management system includes a processor for controlling the rate of cooling of the heat source.

The invention will now be explained in more detail with reference to the drawings.

Figure 1:
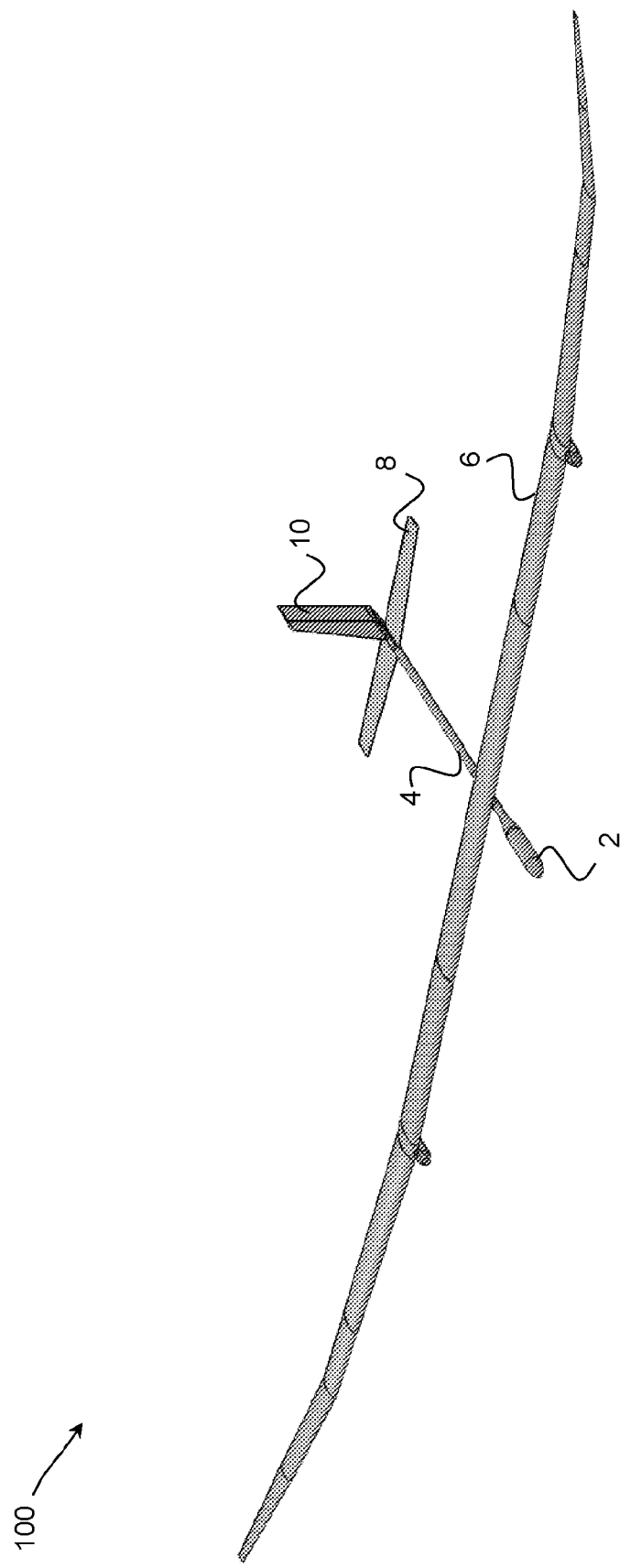
FIG. 1 is a perspective view of an aircraft.

An aircraft 100, specifically a HALE unmanned aeroplane, is shown in FIG. 1. While an aircraft 100 is shown here, it would be readily appreciated that the present invention is applicable to other types of vehicles, such as cars, ships, spacecraft, airships and trains. The present invention is particularly applicable to vehicles having burdensome weight restrictions, as the thermal management system described herein tends to be relatively light weight. The aircraft 100 includes a wing member 6 having a wing span of about 35 metres and a relatively narrow chord (i.e. of the order 1 metre). The wing member 6 is coupled to a fuselage 4. To aerodynamically balance the aircraft 100, a horizontal tailplane 8 and a vertical tail fin (or vertical stabilizer) 10 are coupled to the rear of the fuselage 4. A payload module 2 is coupled to the front of the fuselage 4, i.e. the nose of the aircraft 100. An engine having a propeller is mounted to the wing member 6 on both sides of the fuselage 4. The engines are powered by a combination of solar panels mounted to the upper surfaces of the wing member 6 and batteries disposed inside the fuselage 4 and/or wing member 6.

The aircraft 100 is of lightweight construction. For example, the fuselage 4, wing member 6, payload module 2, tailplane 8 and tail fin 10 are made of a monocoque carbon fibre laminate skin structure. In other words, the skin forms the aircraft's body. In other embodiments, the body is substantially made of a light weight metal, such as titanium, titanium alloy, aluminium or aluminium alloy.

A number of heat sources may be present within the aircraft 100. For example, the payload module 2 may contain a processor and/or camera equipment which generate heat when in operation. The batteries disposed in the wing member 6 and/or fuselage 4 may generate heat when charging or discharging. Radio equipment in the fuselage 4 or payload module 2 may generate heat when transmitting data. Due to the relatively low airspeed of air crossing the surfaces of the aircraft 100, and the low air density at the high altitudes at which it tends to operate, it can be difficult to draw heat away from the aircraft 100. It is important to draw heat away from heat sources, at least in some circumstances, to prevent damage to components of the aircraft 100 or to prevent a reduction in their performance.

Figure 2:
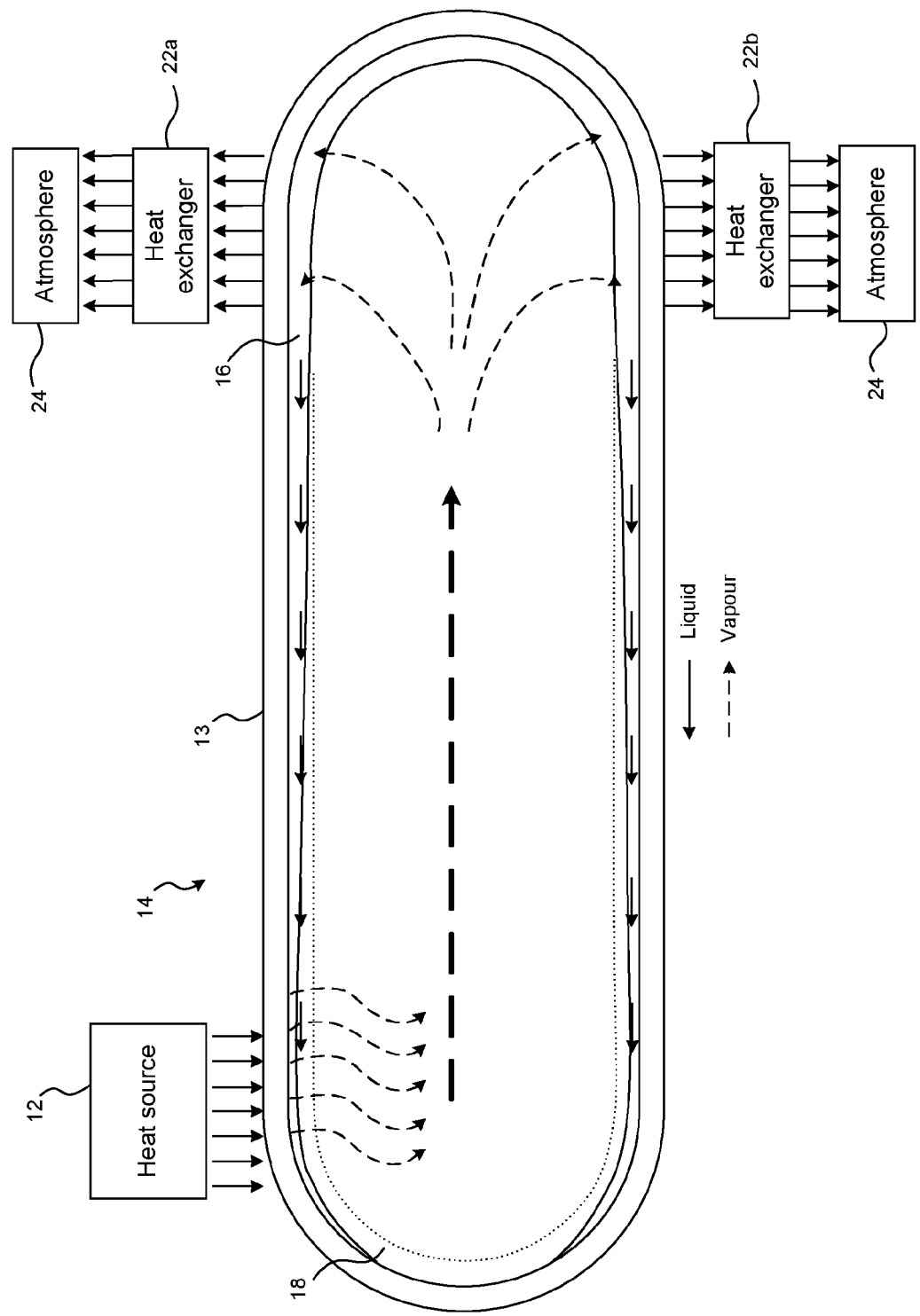
FIG. 2 is system diagram of a thermal management system within a vehicle according to embodiments of the present invention.

A thermal management system for drawing heat away from the heat source 12 is shown in FIG. 2. The thermal management system includes a heat pipe 14. The heat pipe 14 is a passive elongate sealed heat-transfer device that combines the principles of both thermal conductivity and phase transition to effectively transfer heat between two solid interfaces. The heat pipe 14 would be familiar to someone skilled in the art of manufacturing microelectronics and relatively small electronic consumer devices, for example, but not generally to someone designing a vehicle, particularly an aircraft 100.

The heat pipe 14 comprises a vacuum-tightened vessel 13, porous wick structure 18, and working fluid 16. The wick structure 18 is arranged on the inside of the vessel 13 at the end of the heat pipe 14 proximate to the heat source 12. This end of the heat pipe 14 functions as an evaporator. As heat from the heat source 12 is input at the evaporator end, the fluid 16 vaporises, creating a pressure gradient. This pressure gradient pushes the vapour to flow along the heat pipe 14, through the central channel, to the condenser end (i.e. the end proximate the heat exchangers 22a, 22b) where it condenses due to this end being cooler, giving up its latent heat of vaporisation. The working fluid 16 is then returned to the evaporator end by capillary forces developed in the wick structure 18 or by gravity.

The pressure vessel 13 (i.e. main body) of the heat tube 14 comprises a material having high strength and high thermal conductivity, such as copper or aluminium. The working fluid 16 comprises a fluid having high latent heat and high thermal conductivity, such as liquid helium, ammonia, alcohol or ethanol. In a preferred embodiment, liquid helium is used as the working fluid 16 as it is efficient at the ambient temperatures in which a HALE aircraft will typically operate, for example down to −70 degrees Celsius. The wick structure 18 maintains effective capillary action when bent or used against gravity. The wick structure 18 comprises, for example, sintered copper powder, screen or a series of grooves parallel to the longitudinal axis of the heat pipe 14.

The evaporator end of the heat pipe 14 is disposed in proximity to the heat source 12. The opposite end (i.e. the condenser end) of the heat pipe 14 is disposed in proximity to at least one heat exchanger 22a, 22b (generally, 22). As discussed in more detail with reference to FIG. 3, in some embodiments the condenser end of the heat pipe 14 is bifurcated such that one branch of the condenser end is disposed adjacent a first heat exchanger 22a and another branch of the condenser end is disposed adjacent a second heat exchanger 22b. In the embodiment shown in FIG. 2, the heat pipe 14 is not bifurcated, and here there is a heat exchanger 22a, 22b disposed on either side of the condenser end of the heat pipe 14.

Further, the evaporator end of the heat pipe 14 may be bifurcated, or further divided, to approach the heat source 12 from different directions or to allow a single heat pipe 14 to be used to transport heat away from a plurality of heat sources 12.

The heat exchangers 22, described in more detail with reference to FIG. 5, distribute heat from the heat pipe 14 to the atmosphere 24 surrounding the vehicle (such as the aircraft 100 in FIG. 1).

Figure 3:
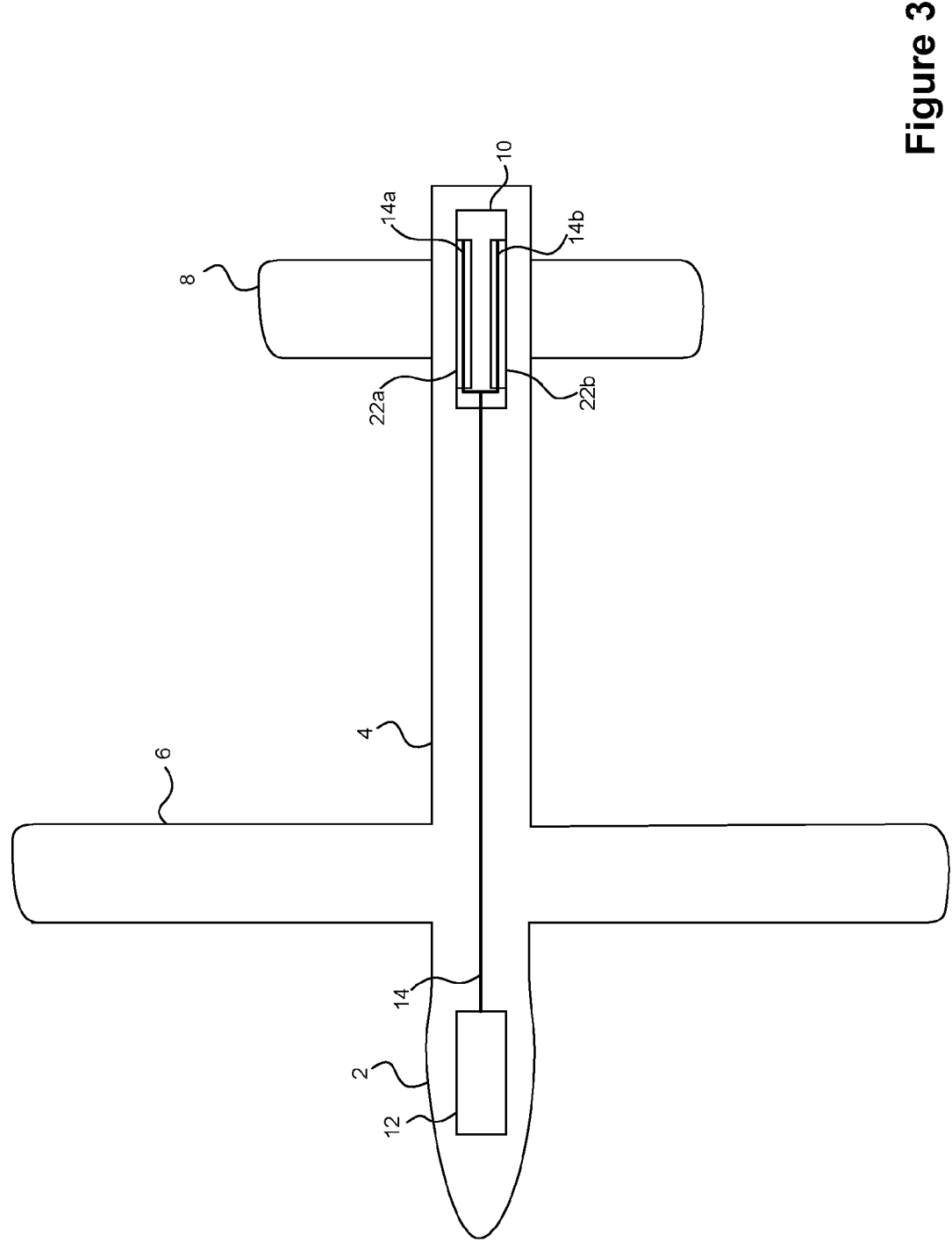
FIG. 3 is a plan view of an aircraft having a thermal management system according to embodiments of the present invention.

FIG. 3 shows a plan view of a thermal management system implemented in an aircraft 100. The heat pipe 14 is disposed along the length of the fuselage 4, i.e. parallel to the longitudinal axis of the fuselage 4, to draw heat away from a heat source 12 in the payload module 2 toward the tail fin 10. While the heat source 12 is shown disposed within the payload module 2, in other embodiments the heat source 12, and consequently evaporator end of the heat pipe 14, is disposed in a different part of the aircraft 100. For example, the heat source 12 may be the engines coupled to the wing member 6 of the aircraft 100.

A first branch 14a of the condenser end of the heat pipe 14 is disposed adjacent to a first heat exchanger 22a on the port side of the tail fin 10 and a second branch 14b of the condenser end of the heat pipe 14 is disposed adjacent to a second heat exchanger 22b on the starboard side of the tail fin 10. As shown in FIG. 7, the two branches 14a, 14b pass through fins of respective heat exchangers 22a, 22b. Meanwhile, in other embodiments, the condenser end of the heat pipe 14 is not bifurcated. Here, the fins may overlap each other such that the undivided condenser end of the heat pipe 14 can intersect each fin. Alternatively, there may only be a single heat exchanger 22.

Further, instead of being directed toward the tail fin 10, in some embodiments the heat pipe 14 passes through part of the fuselage 4 and enters the wing member 6. Here, the heat exchanger(s) 22 is/are integrated with an upper and/or lower surface of the wing member 6. For example, one heat exchanger 22a is integrated with the wing member 6 on the starboard side of the fuselage 4 and another heat exchanger 22b is integrated with the wing member 6 on the port side of the fuselage 4. In other embodiments, the heat exchanger(s) 22 is/are integrated with upper and/or lower surfaces of the horizontal stabiliser 8. It is advantageous to distribute the heat exchanger 22 over a large surface area to increase the rate of heat dissipation to the atmosphere 24.

Figure 4:
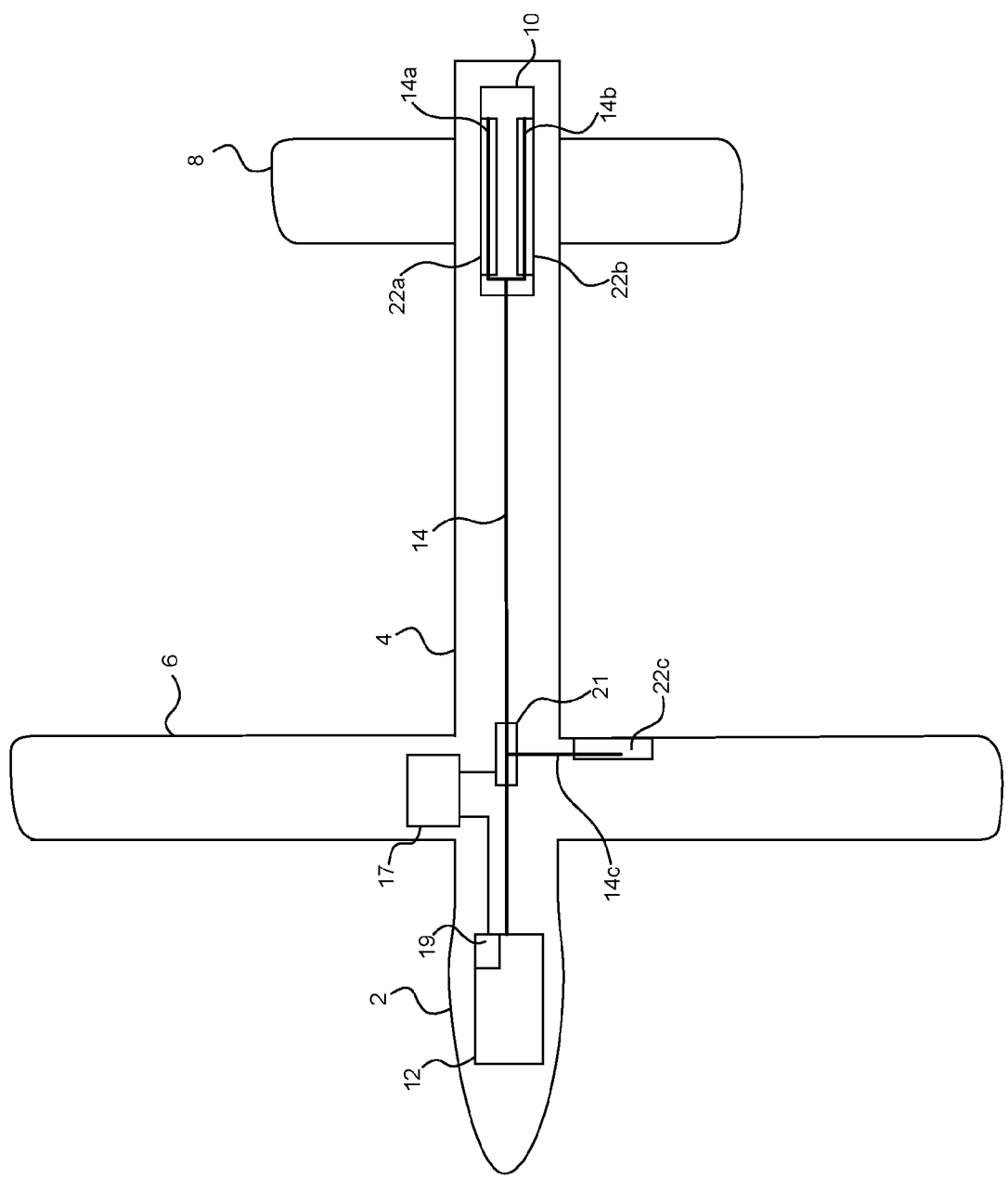
FIG. 4 is a plan view of an aircraft having a thermal management system according to further embodiments of the present invention.

FIG. 4 shows an aircraft 100 having a thermal management system according to another embodiment. In addition to the components of the embodiments described with reference to FIG. 3, the embodiments now described with reference to FIG. 4 include a heat pipe extension 14c, a flow control unit 21, a controller 17, a temperature sensor 19 and a wing-mounted heat exchanger 22c. The controller 17 may be part of the flow control unit 21, or a separate but electrically connected component.

The heat pipe extension 14c is an extension to the condenser end of the heat pipe 14 as described with reference to FIG. 2. The heat pipe extension 14c terminates in proximity to the wing-mounted heat exchanger 22c. The heat pipe extension 14c is fluidically coupled to the heat pipe 14 by way of the flow control unit 21. The heat pipe extension 14c may be narrower than the heat pipe 14. The wing-mounted heat exchanger 22c has a smaller surface area than one of the tail-mounted heat exchangers 22a, 22b. However, in other embodiments, the wing-mounted heat exchanger 22c may have an increased surface area relative to the tail-mounted heat exchangers 22.

The flow control unit 21 includes at least one controllable valve for directing the heat transport medium (i.e. vapour and working fluid 16) to continue to flow along the heat pipe 14 from the heat source 12 toward the tail fin 10 (and vice versa), or to flow along the heat pipe extension 14c toward (or away) from the wing-mounted heat exchanger 22c, or to flow along both. The flow control unit 21 may comprise a valve disposed in the heat pipe and another valve disposed in heat pipe extension 14c. By allowing the heat transport medium to travel along both the heat pipe 14 and the heat pipe extension 14c, the surface area of the condenser end tends to be increased such that the rate at which heat is removed from the heat source 12 is increased.

By preventing vapour from flowing along the full length of the heat pipe 14 main channel to the heat exchangers 22, and instead directing the vapour to flow along the heat pipe extension 14c, the rate at which heat is drawn from the heat source 12 (i.e. the rate at which the heat source 12 is cooled) is reduced but not stopped. By closing the valves within the flow control unit 21 completely, heat is substantially prevented from being drawn away from the heat source 12. In other words, the flow control unit 21 may be controlled or configured to prevent the vapour reaching any heat exchanger 22, such that heat is not lost from the system. Preventing heat from reaching the heat exchangers, or minimising their output under certain conditions, can reduce the thermal signature of the aircraft 100, which is advantageous when a threat having an Infrared Search and Track (IRST) system or heat-seeking missile is in the vicinity of the aircraft 100.

In other embodiments, there may be further heat pipe extensions for optionally transporting heat in alternative directions. In other embodiments, the flow control unit 21 may comprises a single valve operable such that the heat transfer medium is either able to travel along the heat pipe 14 away from the heat source 12, or it is prevented (i.e. blocked) from flowing altogether. In other words, the flow control unit 21 may be incorporated into the thermal management system without additional heat pipe extensions.

The temperature sensor 19 is, for example a thermocouple. The temperature sensor 19 may be incorporated onto a MEMS chip. As shown in FIG. 4, in some embodiments the temperature sensor 19 is integrated with the heat source 12. In other embodiments, the temperature sensor 19 is disposed adjacent to the heat source 12. The temperature sensor 19 is electrically coupled to the controller 17. The temperature sensor 19 transmits a continuous signal to the controller 17 indicative of the temperature of the heat source 12. In embodiments where there are a plurality of heat sources 12, there may be a plurality of temperature sensors 19, each associated with each heat source 12.

The controller 17 may take any suitable form. For instance, it may be a microcontroller, plural microcontrollers, a processor, or plural processors. The controller 17 receives the signal indicative of temperature of the heat source 12 from the temperature sensor 19. The controller 17 compares the temperature of the heat source 12 with a threshold temperature. The controller 17 then generates a control signal to control the flow control unit 21 to change the flow rate of the heat transfer medium in the heat pipe 14 in dependence on the temperature of the heat source 12.

For example, if the temperature of the heat source 12 is less than the threshold, the controller 17 generates a control signal to close the valve(s) in the flow control unit 21 such that heat loss from the heat source 12 is reduced. This may be advantageous where a system onboard the aircraft 100 has not been activated in a long period of time and does not function optimally at cold temperatures, and therefore it is desirable for that system to heat up quickly once in use. For example, Commercial Off The Shelf (COTS) derived equipment (e.g. optics, router or radios) may not be able to operate correctly or effectively at the altitudes (i.e. low temperatures) HALE aircraft typically operate at. Therefore, some equipment may require being brought into a 'standby state' before it can be brought up to full operation. It may further be desirable it limit the rate of heat loss when the aircraft 100 is on the ground or flying at lower altitudes, as here warm air is naturally drawn out of the heat exchangers 22 at a greater rate due to the relative air pressure and speed.

Where the temperature of the heat source 12 far exceeds the threshold, or exceeds a second threshold greater than the first threshold, the controller 17 may control the flow control unit 21 to open both valves to allow the vapour transporting the heat to flow away from the heat source 12 as quickly as possible. For example, equipment designed specifically to operate in a colder climate, such as the climate at HALE operating altitudes, requires additional cooling post coming 'off station' such as an unexpected descent or landing.

Instead of the arrangement shown in FIG. 4, the flow control unit 21 may instead or additionally be installed at the junction between the first branch 14a and the second branch 14b. In a first mode, vapour transporting heat energy is allowed to flow toward the starboard heat exchanger 22a but not the port heat exchanger 22b, thereby reducing but not preventing the rate at which heat is lost from the system. In a second mode, vapour transporting heat energy is allowed to flow toward the port heat exchanger 22b but not the starboard heat exchanger 22a. In a third mode, the vapour transporting heat energy is allow to flow toward both heat exchangers 22a, 22b to increase the rate of heat loss. In a fourth mode, the valve(s) of the fluid control unit 21 are closed to prevent heat being lost through either heat exchanger 22a, 22b. Thermal control may be stabilised by the controller 17 cycling the fluid control unit 21 through the different modes.

Further, the thermal management system may comprise means for the controller 17 to determine the ambient atmospheric temperature on both sides of the aircraft 100. In other words, a temperature sensor 19 may be disposed on the outside surface of the aircraft 100. A temperature sensor 19 may be disposed adjacent or proximate to each heat exchanger 22.

Here, the controller 17 is configured to optimise the thermal management system by controlling the flow control unit 21 to direct vapour only toward the heat exchanger 22 having the lowest ambient temperature.

In other embodiments, the fluid control unit 21 is a mechanism for physically moving the evaporator end of the heat pipe 14 away from the heat source 12 such that heat is not drawn away from the heat source 12. In one embodiment, the heat pipe 14 is telescopic. Here, the fluid control unit 21 comprises a motor for driving the heat pipe 14 to extend or contract in response to a control signal from the controller 17. In other words, the controller 17 receives a temperature measurement from the temperature sensor 19. If the temperature is less than a threshold, indicating that the heat source 12 is too cold or otherwise does not need to be cooled, the controller 17 generates a control signal to retract (or contract) the heat pipe 14 to move the evaporator end away from the heat source.

In an alternative embodiment again, the fluid control unit 21 comprises a pivot point or rotary hinge. It may comprise a rack and pinion or other gear arrangement for rotating the heat pipe 14 about the pivot point to move the evaporator end of the heat pipe 14 away from into proximity with the heat source 12. In an alternative embodiment again, the fluid control unit 21 comprises a sliding mechanism for relocating/repositioning the heat pipe 14.

A heat exchanger 22 according to embodiments will now be described with reference to FIG. 5. A plurality of fins 26a, 26b, 26c (generally 26) are affixed at one end to an insulating plate 24. Three fins 26 are shown, but it would be generally understood that a heat exchanger 22 may include one or more fins 26. The fins 26 are made of a material with relatively high thermal conductivity, such as metal, graphite or beryllium oxide. The metal is preferably a relatively low density metal such as titanium or aluminium, but may be chosen specifically for its thermal conduction properties. The metal may be a metal alloy. The insulator plate 24 is made of a structurally supportive insulating material such as carbon fibre or a ceramic. While the insulating plate 24 prevents heat transferring to an unintended part or side of the vehicle, it is not essential. Instead, the fins 26 may be coupled to each other, or otherwise supported within the heat exchanger 22.

Figure 5:
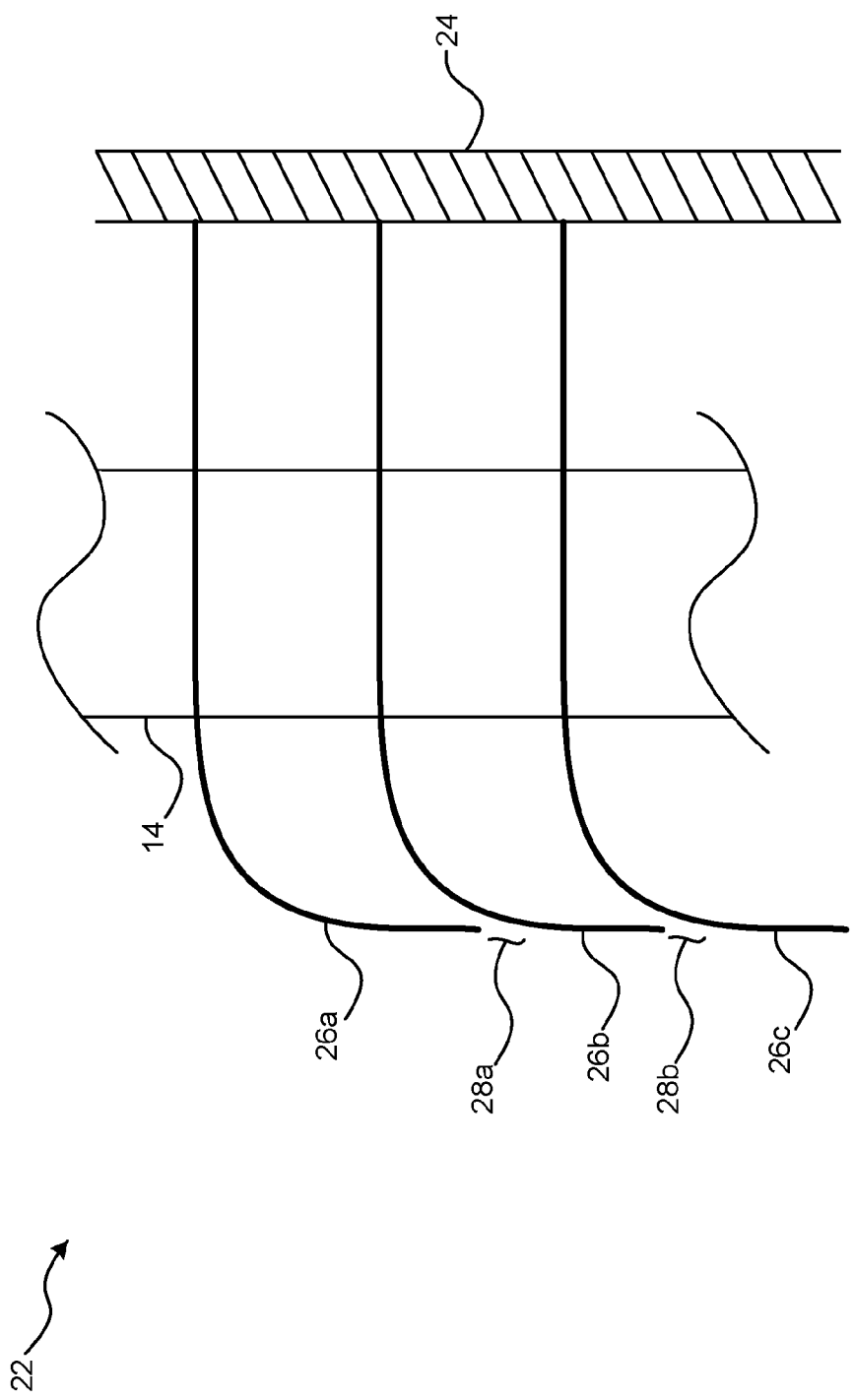
FIG. 5 is a cross-sectional view of a heat exchanger according to embodiments of the present invention.

In the embodiment shown in FIG. 5, the fins 26 are cantilevered, being fixed only at one end. However, in other embodiments, the fins may have support struts extending from the inside surface of the top or bottom of the heat exchanger 22. Further, in some embodiments, the fins 26 are fixed directly to a side of the heat exchanger 22 internal wall. Each fin 26 comprises a first portion for extending the fin 26 away from the insulator plate 24. The first portion in the orientation shown in FIG. 5 is parallel with the horizontal plane of the vehicle. In other words, the first portion is substantially horizontal. However, in other embodiments, the first portion may be angled relative to the horizontal plane, for example by up to 60 degrees. Each fin 26 also comprises a second portion substantially aligned with the skin of the vehicle surrounding the heat exchanger 22. In other words, a second portion of the fins 26 matches the contours of the vehicle body to minimise drag and/or such that the body maintains an aerofoil profile for lift generation. Each first portion is coupled to each second portion by a bent or curved portion of the respective fin 26.

The fins 26 are arranged such that a relatively small aperture 28a, 28b (generally 28) exists between the free end of one of the fins 26 and the vehicle body. Furthermore, in embodiments where there are a plurality of fins 26, each adjacent fin 26 is arranged such that a relatively small aperture 28a exists between the free end of one fin 26a and the second portion of the next fin 26b substantially aligned with the body of the vehicle. The apertures 28 are small relative to the height of the heat exchanger 22.

The apertures 28 provide isolation between the fins 26 to minimise conduction from adjacent fins 26 but with minimal turbulence, thereby reducing the additional drag on the vehicle generated by having an open surface. The apertures 28 also allow the escape of any air between the fins 26 to 'wick' away the warmer air between the fins 26.

The condenser end of the heat pipe 14 extends through each of the fins 26 such that heat is efficiently absorbed by the fins 26. The heat pipe 14 extends through the first portion of the fins 26.

The terms "vertical", "top" and "horizontal" are defined relative to the main horizontal plane of the vehicle. FIG. 5 assumes the bottom of the page aligned with the horizontal plane of the vehicle, which may be an aircraft 100 as previously described. For example, if the nose of the aircraft 100 is pointed straight upwards, away from the ground, the first portion of the fins 26 will still be considered substantially horizontal.

Equally, it would be readily understood that the insulating plate 24 may be arranged horizontally instead of as shown in FIG. 5. For example, this may be where the heat exchanger 22 is disposed in an upper or lower surface of the wing member 6. Here, the first portion of the fin 26 is arranged vertically with respect to the horizontal plane of the aircraft 100.

FIG. 6 shows a perspective view of a heat exchanger 22 incorporated into a vertical tail fin 10 of an aircraft 100. The tail fin 10 includes a cavity into which the fins 26 are inserted. The size of the opening of the cavity (i.e., the external surface area of the heat exchanger 22) is chosen to optimise weight and heat transfer efficiency. For example, a cost function may be used to determine the dimensions of the cavity and/or the number of heat exchangers 22. On a HALE aircraft 100, for example, where the aircraft's skin is predominantly formed of lightweight insulating materials, the heat exchanger 22 will weigh more per unit area than the surrounding skin, and therefore the extent of the heat exchanger 22 should be minimised. However, the larger the heat exchanger 22, the more heat is dissipated per unit time, and therefore a larger cavity in the tail fin 10 may be optimal if there are a plurality of heat sources 12 and/or the rate of temperature increase is high. In the embodiment shown in FIG. 6, the heat exchanger 22 extends across most of the surface area of the tail fin 10.

When facing the heat exchanger 22 orthogonally to its vertical plane, the apertures 28 would not be visible due to the second portion of one fin 26a overlapping the second portion of the adjacent fin 26b. The position and extent of the apertures 28 is exaggerated in the Figure for ease of reference.

By overlapping the second portions of the fins 26, and angling those portions such that they are substantially aligned with the plane of the surrounding body of the aircraft 100 (in this case, the tail fin 10), the second portions of the fins 26 effectively become part of the skin of the aircraft 100 and tend not to inhibit the air flow over the body. In other words, the second portions of the fins are arranged to match the contour of the skin adjacent the opening of the cavity.

Where the heat exchanger 22 is incorporated into the wing member 6 or horizontal tailplane 6, the second portions of the fins 26 form part of an aerofoil.

Figure 7B:
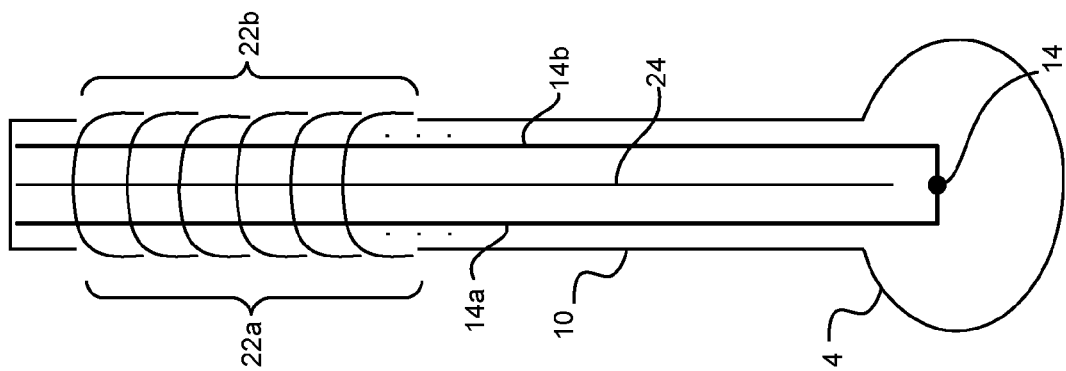
FIGS. 7a and 7b are cross-sectional views through a vertical tail fin having a heat exchanger as shown in FIG. 5.
Figure 7A:
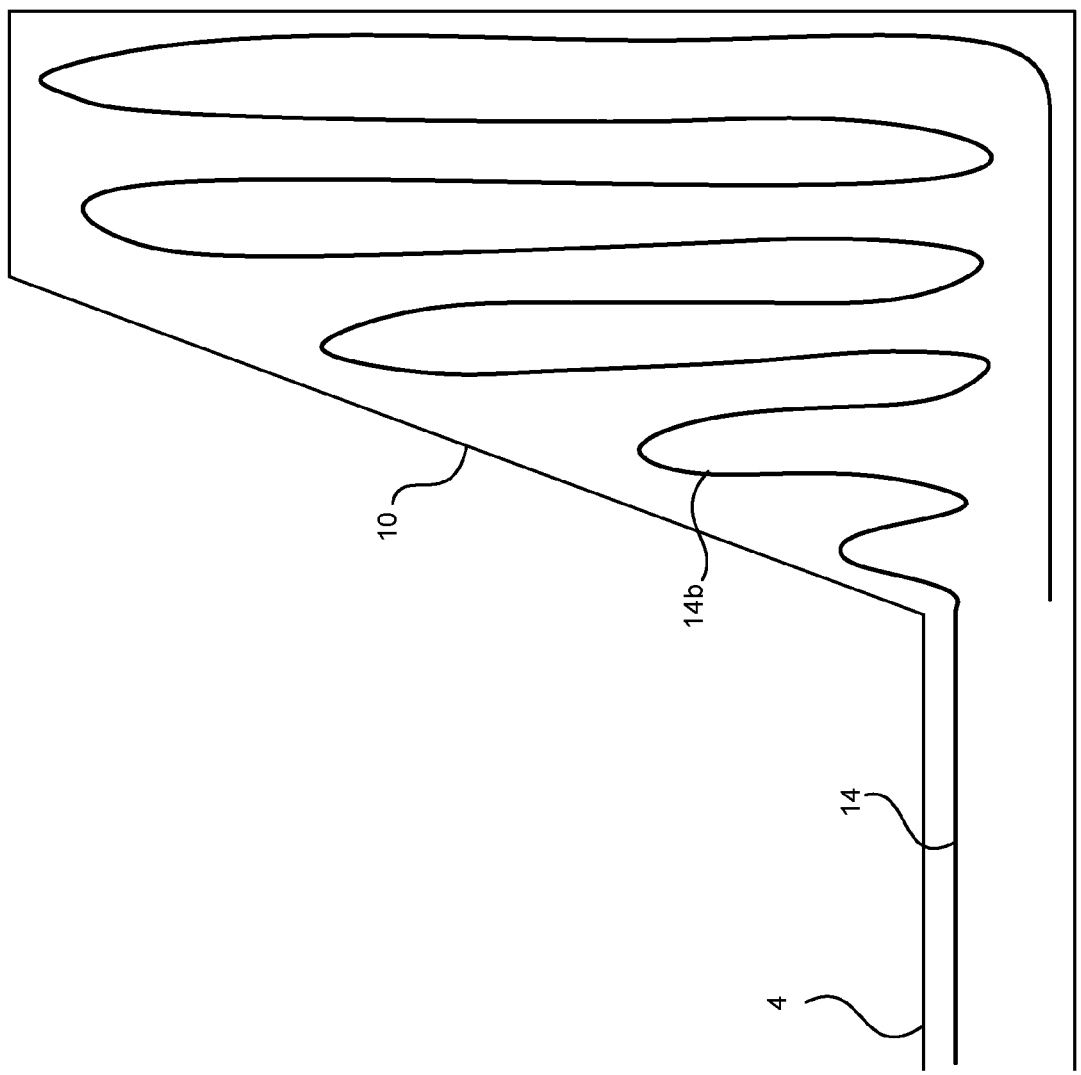

FIGS. 7a and 7b show cross-sectional views through the tail fin 10 shown in FIG. 6. FIGS. 6, 7a and 7b are not drawn to scale. FIG. 7a is a view of the port side of the tail fin 10. The port side comprises a cavity having the second branch 14b disposed therein. The second branch 14b follows an undulating pattern to maximise its surface area within the tail fin 10.

For ease of reference, FIG. 7b does not show all of the fins 26 of FIG. 6. The first branch 14a of the condenser end of the heat pipe 14 is shown disposed on the starboard side of the tail fin 10 and the second branch 14b is shown disposed on the port side of the tail fin 10. The first branch 14a and second branch 14b recombine at the bottom of the tail fin 10, within the fuselage 4, to form the heat pipe 14 main channel. A single insulator plate 24 is disposed between the first branch 14a and second branch 14b to separate them. The insulator plate 24 is advantageous in embodiments where the two heat exchanges 22a, 22b are managed separately. In some embodiments, there may only be a single condenser (i.e. rather than bifurcated braches). Here, the fins 26 may have a first portion through which the heat pipe 14 extends. The first portion is substantially horizontal. Each fin 26 is then folded over at either end of the first portion creating a single heat exchanger 22 with two faces exposed to the atmosphere 24.

While only one heat pipe 14 is shown in the Figures, it would be appreciated that a plurality of heat pipes may be disposed throughout the vehicle to draw heat away from different areas of the vehicle.

Embodiments herein have described the thermal management system with reference to an aircraft 100, with the heat exchanger 22 disposed in the tail fin 10 of the aircraft. However, it would be appreciated that other types of vehicular implementations are anticipated. For example, the lightweight construction of the thermal management system is readily applicable to sports cars, for example Formula 1™ cars, or lighter-than-air vehicles. On a sports car, for example, the heat exchanger 22 may be integrated with the rear diffuser or spoiler.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. A vehicle comprising:
a body having a skin;
a heat source; and
a thermal management system comprising:
a heat pipe comprising:
an evaporator end and a condenser end;
a vapour arranged to flow from the evaporator end to the condenser end; and
a working fluid arranged to flow from the condenser end to the evaporator end,
wherein the heat pipe is arranged such that the evaporator end is arranged in proximity to the heat source to absorb heat from the heat source; and
one or more heat exchangers arranged in proximity to the condenser end and integrated with the skin;
wherein the one or more heat exchangers each comprise one or more fins disposed in an opening in the body of the vehicle; and
wherein a portion of each of the one or more fins is/are arranged to match the contour of an adjacent skin surrounding the opening to form a portion of the skin, and wherein the condenser end of the heat pipe is arranged adjacent to each of the one or more fins.

2. The vehicle according to claim 1, further comprising:
a first temperature sensor for measuring the temperature of the heat source;
translation means for causing the heat pipe to translate from a first configuration to a second configuration in response to a control signal, wherein in the first configuration the evaporator end is arranged in proximity to the heat source and in the second configuration the evaporator end is arranged at a greater distance from the heat source than in the first configuration; and
a processor arranged to receive a temperature measurement from the first temperature sensor and to generate a control signal to control the translation means to translate the heat pipe from the first configuration to the second configuration or from the second configuration to the first configuration depending on whether the temperature is respectively less than or greater than a threshold.

3. The vehicle according to claim 2, wherein the one or more heat exchangers comprises a first heat exchanger disposed on a first side of the vehicle and a second heat exchanger disposed on a second side of the vehicle, wherein a first part of the condenser end is arranged adjacent to the one or more fins of the first heat exchanger and a second part of the condenser end is arranged adjacent to the one or more fins of the second heat exchanger.

4. The vehicle according to claim 1, further comprising:
a first temperature sensor for measuring the temperature of the heat source;
switching means for modifying the flow of vapour along the heat pipe in response to a control signal to increase or decrease the rate of heat loss from the heat source; and
a processor arranged to receive a temperature measurement from the first temperature sensor and to generate a control signal to control the switching means to modify the flow of vapour in dependence on the temperature measurement.

5. The vehicle according to claim 1, wherein the portion of a first one of the fins is separated from the portion of a second one of the fins such that an air gap is provided between the fins.

6. The vehicle according to claim 1, wherein the one or more heat exchangers comprises a first heat exchanger disposed on a first side of the vehicle and a second heat exchanger disposed on a second side of the vehicle, wherein a first part of the condenser end is arranged adjacent to the one or more fins of the first heat exchanger and a second part of the condenser end is arranged adjacent to the one or more fins of the second heat exchanger.

7. The vehicle according to claim 6, further comprising:
a second temperature sensor disposed on the first side of the vehicle to measure the temperature of the atmosphere proximate to the first heat exchanger;
a third temperature sensor disposed on the second side of the vehicle to measure the temperature of the atmosphere proximate to the second heat exchanger;
switching means for selectively directing the flow of vapour toward the first heat exchanger, the second heat exchanger, or both; and
a processor in electrical communication with the second and third temperature sensors, the processor being arranged to:
determine which of the first side and second side of the vehicle is cooler, and generate a control signal to control the switching means to direct the flow of vapour to the heat exchanger on the cooler side of the vehicle.

8. The vehicle according to claim 1, wherein the one or more heat exchangers is integrated with a tail fin of an aircraft.

9. The vehicle according to claim 1, wherein the vehicle is a High Altitude Long Endurance aircraft.

10. The vehicle according to claim 1, wherein the one or more heat exchangers is integrated with a spoiler of a car, such that the one or more fins forms a portion of the skin of the spoiler.

11. A method of managing temperature in the vehicle according to claim 1, comprising:
    measuring the temperature of the heat source;
    generating a control signal for controlling a switching means in dependence on the measured temperature; and
    controlling the switching means to modify the flow path of vapour along the heat pipe in response to the control signal to increase or decrease the rate of heat loss from the heat source.

12. The method according to claim 11, wherein if the measured temperature is less than a first threshold, the switching means is controlled to block the flow of vapour along the heat pipe to reduce heat loss from the heat source.

13. The method according to claim 11, wherein if the measured temperature is greater than a threshold, the switching means is controlled to direct the flow of vapour along the heat pipe and a secondary heat pipe simultaneously.

14. A method of managing temperature in a vehicle according to claim 1, comprising:
    measuring the temperature of the heat source;
    generating a control signal for controlling a translation means in dependence on the measured temperature; and
    controlling the translation means to translate the heat pipe to a first configuration if the measured temperature is greater than a threshold or to a second configuration if the measured temperature is less than a threshold, wherein in the first configuration the evaporator end is proximate to the heat source and in the second configuration the evaporator end is arranged at a greater distance from the heat source than in the first configuration.

* * * * *